UNITED STATES PATENT OFFICE 2,687,354

RUMINANT FEED COMPOSITION

Myers F. Gribbins, Wilmington, Del., assignor to E. I. du Pont de Nemours and Company, Wilmington, Del., a corporation of Delaware No Drawing. Application October 13, 1951, Serial No. 251,241

12 Claims. (Cl. 99—2)

This invention relates to a new source of protein to supplement the feeding of Ruminantia, a division of ungulate mammals, with a quadripartite or tripartite stomach, and more especially is directed, inter alia, to providing non-protein nitrogen products to assist the microflora and microfauna of such animals to produce protein. This application is a continuation-in-part of my abandoned copending application S. N. 196,707, filed November 20, 1950.

The importance of protein in the nutrition of animals has been known for more than a century. It is an essential constituent of all living cells, for the body tissues of all ainmals, muscles, internal organs, nervous systems and external tissues are made up largely of protein materials. Animal life, accordingly, requires protein for growth, for replacement of body tissues and fluids and for the production of such animal products as milk, meat and wool.

As early as 1918 carbamide, or urea, was used effectively, along with oil seed meals, as an indirect source of protein for ruminants. While this chemical compound can be assimilated by them, after conversion by their rumen to protein, and its use will supplement the protein diet of such animals, the efficiency of nitrogen retention by the animal is relatively low. Moreover, urea feeding must be carried out with considerable care in order to minimize the potential hazards of ammonia-nitrogen release resulting from hydrolysis of urea to ammonia at a rate greater than the microorganism can use it. The excess finds its way into the blood stream with possible resulting alkalosis of the animal. The efficiency of nitrogen retention and the potential hazards involved in urea feeding are, accordingly, very closely related and concern the speed with which the ammonium-nitrogen is absorbed from the rumen contents by the animal's blood stream. Ammonia thus absorbed tends to lower the efficiency of utilization and also as the ammonia content of the blood exceeds a certain relatively low concentration, ammonia toxicity and death of the animal may result. For safety, therefore, urea must be fed to ruminants under a controlled dietary regimen to avoid too rapid an assimilation of the resultant ammonia by the animal.

An object of the present invention is to provide a source of protein for Ruminantia. Yet another object is to provide from non-protein nitrogen supplements a food, for rumen microorganisms, of low potential hazards from ammonia-nitrogen absorption. Still another object is to provide a supplemental feed composition for cattle containing as an essential ingredient thereof a reaction product of urea. A further object of the invention is to provide condensation products of urea with aldehydes as a supplemental nitrogen feed for ruminants. Other objects and advantages of the invention will hereinafter appear.

In its broadest aspects the invention constitutes certain nitrogen containing non-protein food supplements for Ruminantia. These food supplements, more particularly described hereinafter, are broken down by the content of the rumen with its microflora and microfauna to fragments that are converted to protein, the latter being used directly by the animal as a food and/or as an aid to the animal in its digestion of cellulose. Break-down appears to involve, inter alia, hydrolysis of the nitrogen supplement to ammonia, or ammonium salts, believed to be an intermediate in the production of protein by this chemical and/or bacteriological cycle. Applicant has found that ammonia evolution, whether responsible for or only incidental to the formation of protein, must be maintained at a low level for if it is allowed to increase above a prescribed maximum level the ammonia will be absorbed into the blood stream of the animal. Urea has been used for some time as a nitrogen supplement but its use must be carefully controlled because the rumen content is capable of producing ammonia from urea at a rate greater than the ammonia can be converted to protein or protein-like products. The excess of ammonia over that properly consumed is absorbed, as has been noted, in the blood stream and is responsible for alkalosis together with attendant complications. J. S. Dinning, H. M. Briggs et al., Am. J. Physiol. 153, 41–46 (1948). Certain nitrogen containing non-protein compounds can be used in accord with the invention, providing (1) these compounds will hydrolyze to give ammonia in the presence of rumen microflora and microfauna and (2) providing these compounds given an ammonia level not greater than 85% and preferably less than 70% of that given by urea on an equivalent nitrogen weight basis. Such compounds can be used with considerably less risk of alkalosis and attendant physiological derangement of the animal.

The nitrogen containing non-protein compounds above defined, that can be used for this purpose, include the organic acid amides, such as formamide, acetamide, propionamide, glycineamide and the higher organic acid amides; the ammonium salts of such organic acids as succinic and lactic; the amidines and especially salts thereof, e. g. creatinine, creatine and guanidine carbonate, acetate and hydrochloride; and such ammonium salts as ammonium nitrilo trisulfonate and ammonium triamido diphosphate.

More especially the above and other objects of the invention are realized by, as the supplementary source of nitrogen, a compound containing as its essential ingredient a urea-organic compound reaction product or an association of urea with compounds whose breakdown or consumption is slower than that of urea by microorganisms present in the stomachs of ruminant animals. By retarding the breakdown of the urea compound the microorganisms are better able to utilize the nitrogen content of this nitrogen-containing food, i. e. they can convert more of it to protein. Also, at an equivalent level of nitrogen feeding, this retardation restricts the absorption of ammonia by the blood streams to levels well below the toxic limits.

It is well known that not all animals digest proteins in the same manner. Animals having only one stomach, such as horses, hogs and poultry, break down proteins into their composite amino acids by chemical reactions with enzymes and acids. Ruminants, however, have several stomachs, the largest being known as the rumen or paunch. Of the ruminants, cattle, sheep and goats are probably the best known and the study of their digestion has resulted in an entirely new concept of the use of protein by these animals and other ruminants, such as the deer and antelope. It has been found by prior investigators that bacteria, fungi and protozoa in the paunch break down the nitrogen containing substances into simple nitrogen compounds, then the microflora and microfauna actually feed upon these compounds to build their own bodies. By this they arrange the simple nitrogen compounds into materials which later can be used by the animal to produce animal proteins. The cycle may be expressed in this manner—the rumen flora, which are actually simple plants, feed on the simple nitrogen materials. The "plants" grow, develop and are finally digested by the animal. Thus the ruminant actually grows protein-containing materials in its paunch.

As has been stated, urea has for some time been used in the above manner to provide the ruminant with a nitrogen source from which it produces proteins for growth. Urea feeding levels by ruminants must be regulated because the micro-organisms are capable of converting urea to ammonia quicker than they can assimilate the ammonia and thus, at high urea feeding levels, toxic conditions can result. Rationing, however, is not necessary, providing the animal is fed with a supplementary source of nitrogen which cannot be converted to ammonia by the rumen content with sufficient rapidity to develop ammonia toxicity. The methods heretofore described can be used to inhibit the attack by the rumen microorganisms, whereby toxic amounts of ammonia are not evolved and at the same time increase the availability of the nitrogen in the nitrogen supplements, i. e. more being utilized although utilized at a slower rate.

Research conducted over the past several years has shown that the presence of readily available carbohydrates in the rumen considerably accelerates the speed of ammonia utilization of the organisms. Therefore it is important that the nitrogen supplements be fed to ruminants preferably in well balanced rations which provide carbohydrate energy needed for rapid growth of microorganisms in the rumen.

The examples which follow illustrate embodiments of the invention wherein ruminants were fed nitrogen supplementary feed as a potential source of their protein ingestion, which supplements are more effectively used by the animal than urea per se and with considerable decrease in the potential hazard involved in unmodified urea feeding.

The examples given in Table I show results obtained by feeding lambs under nitrogen metabolism conditions. These lambs were fed three basal rations consisting of cottonseed hulls, ground corn, corn starch, cottonseed meal and mineral mix. The three rations differed only in respect to amount of hulls in the mixture. While total energy in each ration was equal, the amount present as readily available carbohydrate was determined by the level of hulls present. To this ration there was added in Examples 2, 5 and 8, a supplemental addition of urea-nitrogen which furnished 3.77 grams of nitrogen. In Examples 3, 6 and 9 there was furnished a supplemental ration of 3.77 grams of total nitrogen of which 64.2% (2.42 grams) was insoluble nitrogen resulting from the reaction of urea with formaldehyde. This urea-formaldehyde condensation product contained 39.2% nitrogen, of which 64.2% was present as insoluble reaction products, 24.6% as soluble reaction products and 11.3% unreacted urea.

TABLE I

| Examples | Dry Matter Intake, gm. | Nitrogen Intake, gm. | Nitrogen Output | | | Nitrogen Retained gm. |
|---|---|---|---|---|---|---|
| | | | Feces, gm. | Urine, gm. | Total, gm. | |
| Ration: | | | | | | |
| High Hulls— | | | | | | |
| 1. Basal | 644 | 7.44 | 5.91 | 2.09 | 7.97 | −0.53 |
| 2. Basal plus urea | 655 | 10.56 | 6.32 | 4.72 | 11.04 | −0.47 |
| 3. Basal plus urea-formaldehyde condensation product | 656 | 10.56 | 8.19 | 2.68 | 11.12 | −0.31 |
| Medium Hulls— | | | | | | |
| 4. Basal | 644 | 7.01 | 5.23 | 1.53 | 6.76 | +0.25 |
| 5. Basal plus urea | 651 | 10.49 | 5.48 | 4.30 | 9.78 | +0.71 |
| 6. Basal plus urea-formaldehyde condensation product | 651 | 10.49 | 7.36 | 2.54 | 9.90 | +0.59 |
| Low Hulls— | | | | | | |
| 7. Basal | 666 | 6.78 | 4.06 | 1.50 | 5.56 | +1.22 |
| 8. Basal plus urea | 675 | 10.55 | 4.26 | 3.99 | 8.25 | +2.35 |
| 9. Basal plus urea-formaldehyde condensation product | 676 | 10.55 | 5.90 | 2.18 | 8.08 | +2.7 |

The above examples show that the nitrogen retention from urea and urea-formaldehyde condensation products was about comparable in each of the three rations. However, the route of nitrogen loss is very informative. It will be noted that in the case of urea, nitrogen output went largely into urine, while that for urea-formaldehyde condensation products appeared in the fecal matter. Therefore, that amount of nitrogen which slowly became soluble from the urea-formaldehyde condensation product apparently was absorbed and utilized very efficiently by the animal. Also, because of this slower availability, ammonia levels in the rumen and, in turn, the animals blood stream remained low and safe.

Other derivatives of urea than those described in the examples may be employed, such, for example, as N-methyl urea; urea-dextrose condensation products; methylene diurea; and urea pyrolysis products. Especially suitable are the urea-aldehyde condensation products, such as urea-starch, urea-cellulose and more particularly the urea-formaldehyde condensation products. The nitrogen content of reaction products of urea with the aldehydes, and with the other compounds which give the aforesaid products, is less readily available to the rumen microorganisms, but instead is slowly dissolved and utilized by the microorganisms to form protoplasm (bacterial, etc.) which is later utilized by the animal in subsequent stomachs. This is especially true of the urea-formaldehyde condensation products and also the condensation products of urea with the higher aldehydes such as acetaldehyde, propionaldehyde, butyraldehyde and the like.

In the examples a urea-formaldehyde condensation product is employed having a specific nitrogen content, specific percentages of insoluble and soluble reaction products and a specific percentage of unreacted urea. The urea-formaldehyde condensation products that may be employed in the preparation of ruminant feeds in accord with the invention, however, may have nitrogen contents ranging between 35 and 44%, insoluble reaction products between 20 and 65%, soluble reaction products between 30 and 75% and unreacted urea between 5 to 20%. The soluble portion of the urea-formaldehyde condensation product is of primary importance because its utilization by the ruminant is slower and consequently safer than urea.

Urea - aldehyde condensation products described in the above examples are but one of several representative non-protein nitrogen containing compounds conforming with the invention. The examples which follow illustrate other representative members, the effectiveness of which was determined by in vitro investigations.

Within the past few years an artificial rumen procedure and technique has been developed whereby the changes taking place in feeds, brought about by rumen microorganisms, can be measured more readily and accurately. This technique involves the use of what might be termed transplanted rumen in which the digestive processes of the animal are conducted and can be studied in vitro with convenience. By this means various animal feeds and supplementary diets are introduced into or withdrawn from the laboratory unit under carefully controlled conditions and the changes that take place studied critically and progressively during the consumption of the feed. The comparability of the results obtained by the use of this transplanted rumen technique have been confirmed by actual feeding of animals.

In the examples which follow an Erlenmeyer flask of approximately one liter capacity was charged with the ingredients of the examples. The 450 ml. of rumen inoculum used was obtained from the first stomach of a fistulated steer which had been fed with a diet consisting of a grain concentrate, alfalfa hay and salt mixture. The extracted rumen content was filtered through cheese cloth to remove solid matter, the liquid filtrate being employed as the rumen inoculum. In Table II the starch content of the flasks was maintained constant by adjusting it to account for the carbohydrate content of the soybean meal used. Moreover, in each flask the nitrogen content is equivalent to that in each of the other flasks, except for the "negative" control in which the only nitrogen present is the low nitrogen content of the hay. The flasks were placed in a constant temperature water bath maintained at approximately 39° C. and carbon dioxide pumped through the charge in the flask to maintain anaerobic conditions. At the end of the first 4 hours of bacterial digestion a sample was withdrawn for analysis to determine the ammonia level in parts per million. Samples at the end of each of the 4 days were likewise taken to determine the amount of cellulose digested.

TABLE II

Flask contents

|  | 1 | 2 | 3 | 4 | 5 | 6 | 7 | 8 | 9 |
|---|---|---|---|---|---|---|---|---|---|
| Hay, g | 10 | 10 | 10 | 10 | 10 | 10 | 10 | 10 | 10 |
| Cellulose, g |  |  |  |  |  |  |  |  |  |
| Molasses ash, g | 0.6 | 0.6 | 0.6 | 0.6 | 0.6 | 0.6 | 0.6 | 0.6 | 0.6 |
| Nutrient salt soln., ml | 60 | 60 | 60 | 60 | 60 | 60 | 60 | 60 | 60 |
| Dextrose, g | 1 | 1 | 1 | 1 | 1 | 1 | 1 | 1 | 1 |
| Starch, g | 1 | 0.22 | 0.48 | 0.61 | 0.74 | 1 | 1 | 1 | 0.61 |
| Soybean meal, g |  | 2.65 | 1.76 | 1.33 | 0.88 |  |  |  | 1.33 |
| Urea-formaldehyde product, g |  |  | 0.16 | 0.24 | 0.32 | 0.48 |  |  |  |
| Urea, g |  |  |  |  |  |  | 0.4 |  |  |
| Methylene diurea, g |  |  |  |  |  |  |  | 0.44 | 0.22 |
| Rumen inoculum, ml | 450 | 450 | 450 | 450 | 450 | 450 | 450 | 450 | 450 |
| H₂O | (¹) | (¹) | (¹) | (¹) | (¹) | (¹) | (¹) | (¹) | (¹) |

¹ Dilute to 900 ml.

Flask #1—"negative" control.
Flask #2—100% soybean meal.
Flask #3—67% soybean meal plus 33% urea-formaldehyde product.
Flask #4—50% soybean meal plus 50% urea-formaldehyde product.
Flask #5—33% soybean meal plus 67% urea-formaldehyde product.
Flask #6—100% urea-formaldehyde product.
Flask #7—100% urea.
Flask #8—100% nitrogen as methylene diurea.
Flask #9—50% nitrogen as methylene diurea plus 50% SBOM.

TABLE II—Continued
Flask contents

NH₃ LEVEL (P. P. M.)

|  | 1 | 2 | 3 | 4 | 5 | 6 | 7 | 8 | 9 |
|---|---|---|---|---|---|---|---|---|---|
| At end of 1st 4 hrs.: | | | | | | | | | |
| 1st day | 140 | 160 | 161 | 178 | 174 | 184 | 369 | 134 | 142 |
| 2d day | 163 | 243 | 248 | 239 | 265 | 258 | 501 | 214 | 250 |
| 3d day | 97 | 213 | 203 | 200 | 180 | 173 | 491 | 151 | 182 |
| 4th day | 60 | 219 | 204 | 168 | 151 | 116 | 440 | 105 | 150 |
| Av | 115 | 209 | 204 | 196 | 193 | 183 | 450 | 151 | 181 |
| At end of— | | | | | | | | | |
| 1st day | 257 | 362 | 355 | 335 | 359 | 336 | 514 | 301 | 364 |
| 2d day | 169 | 324 | 310 | 270 | 281 | 251 | 491 | 220 | 288 |
| 3d day | 92 | 324 | 296 | 258 | 219 | 167 | 469 | 140 | 222 |
| 4th day | 56 | 324 | 276 | 214 | 187 | 111 | 403 | 101 | 200 |
| Av | 144 | 334 | 309 | 269 | 262 | 216 | 469 | 191 | 269 |

TABLE III
Flask contents

|  | 1 | 2 | 3 | 4 | 5 |
|---|---|---|---|---|---|
| Cellulose, g | 9 | 9 | 9 | 9 | 9 |
| Molasses ash, g | 0.6 | 0.6 | 0.6 | 0.6 | 0.6 |
| Nutrient salt soln., ml | 60 | 60 | 60 | 60 | 60 |
| Dextrose, g | 1 | 1 | 1 | 1 | 1 |
| Starch, g | 1 | 1 | 1 | 1 | 1 |
| Urea, g |  | 0.4 |  |  |  |
| Formamide, g |  |  | 0.599 |  |  |
| Guanidine carbonate, g |  |  |  | 0.4 |  |
| Ammonium lactate, ml |  |  |  |  | 1.4 |
| Rumen liquid, ml | 450 | 450 | 450 | 450 | 450 |
| H₂O | (¹) | (¹) | (¹) | (¹) | (¹) |

¹ Dilute to 900 ml.

NH₃ LEVEL (mg.)

|  | 1 | 2 | 3 | 4 | 5 |
|---|---|---|---|---|---|
| At end of 1st 4 hrs.: | | | | | |
| 1st day | 79 | 278 | 99 | 87 | 267 |
| 2d day | 6 | 225 | 28 | 14 | 144 |
| 3d day | 0 | 190 | 33 | 13 | 152 |
| 4th day | 1 | 207 | 34 | 5 | 162 |
| Av | 22 | 225 | 49 | 30 | 181 |
| At end of— | | | | | |
| 1st day | 26 | 94 | 43 | 28 | 74 |
| 2d day | 5 | 100 | 35 | 34 | 85 |
| 3d day | 4 | 124 | 25 | 31 | 79 |
| 4th day | 1 | 104 | 47 | 11 | 81 |
| Av | 9 | 106 | 38 | 26 | 80 |

CELLULOSE DIGESTION (PERCENT)

|  | 1 | 2 | 3 | 4 | 5 |
|---|---|---|---|---|---|
| 1st day | 55 | 84 | 64 | 58 | 81 |
| 2d day | 20 | 96 | 25 | 93 | 93 |
| 3d day | 15 | 75 | 59 | 83 | 78 |
| 4th day | 9 | 60 | 84 | 66 | 43 |
| Av | 25 | 79 | 58 | 75 | 74 |

The nutrient salt solution of Tables II, III and IV contained these ingredients per liter:

Sodium phosphate, monobasic, gm — 52.50
Sodium bicarbonate, gm — 52.50
Ammonium sulfate, gm — 37.50
Potassium chloride, gm — 7.50
Sodium chloride, gm — 7.50
Magnesium sulfate, gm — 2.25
Calcium chloride, gm — 0.75
Ferrous sulfate, gm — 0.15

Table II illustrates the ammonia level obtained with methylene diurea and urea-formaldehyde condensation products as compared with ammonia, while Table III gives the urea level of formamide, guanidine carbonate and ammonium lactate as compared with urea. Separate "negative" controls are used for the reason that the examinations were made on different days and the rumen inoculum has been found to vary slightly from day to day. Accordingly, for more accurate comparison a "negative" control is used for the separate investigations.

In Table II it will be noted that the ammonia level for urea is 469 p. p. m. while that for methylene diurea is 191 p. p. m. The latter, accordingly, gives an ammonia level equal to about 42% of the ammonia level for urea. Similarly the ammonia level for urea-formaldehyde condensation product is 216, i. e. about 47% of the urea ammonia level. The comparison of the ammonia level obtained with soybean meal to the urea-formaldehyde condensation product and to ⅓, ½ and ⅔ replacement of soybean meal with the urea-formaldehyde condensation product gives these percentages for 0, ⅓, ½ and ⅔ urea-formaldehyde condensation product replacement 71%, 66%, 57% and 56% respectively. In Table III formamide, guanidine carbonate and ammonium lactate have an ammonia level as compared with urea of 35%, about 24% and about 75%.

TABLE IV
Flask contents

|  | 1 | 2 | 3 | 4 | 5 | 6 |
|---|---|---|---|---|---|---|
| Hay, g | 10 | 10 | 10 | 10 | 10 | 10 |
| Cellulose, g |  |  |  |  |  |  |
| Molasses ash, g | 0.6 | 0.6 | 0.6 | 0.6 | 0.6 | 0.6 |
| Nutrient salt soln., ml | 60 | 60 | 60 | 60 | 60 | 60 |
| Dextrose, g | 1 | 1 | 1 | 1 | 1 | 1 |
| Starch, g | 1 | 1 | 0.48 | 0.61 | 0.74 | 0.22 |
| Urea, g |  | 0.4 | 0.13 | 0.2 | 0.27 |  |
| Soybean meal, g |  |  | 1.76 | 1.33 | 0.88 | 2.65 |
| Methylene diurea, g |  |  |  |  |  |  |
| Urea-formaldehyde product, g |  |  |  |  |  |  |
| Rumen inoculum, ml | 450 | 450 | 450 | 450 | 450 | 450 |
| H₂O | (¹) | (¹) | (¹) | (¹) | (¹) | (¹) |

¹ Dilute to 900 ml.

Flask #1—"negative" control.
Flask #2—100% urea.
Flask #3—67% soybean meal plus 33% urea.
Flask #4—50% soybean meal plus 50% urea.
Flask #5—33% soybean meal plus 67% urea.
Flask #6—100% soybean meal.

NH₃ LEVEL (p. p. m.)

|  | 1 | 2 | 3 | 4 | 5 | 6 |
|---|---|---|---|---|---|---|
| At end of 1st 4 hrs.: | | | | | | |
| 1st day | 119 | 311 | 232 | 257 | 281 | 156 |
| 2d day | 168 | 461 | 348 | 392 | 432 | 285 |
| 3d day | 108 | 444 | 318 | 348 | 412 | 235 |
| 4th day | 62 | 442 | 307 | 331 | 400 | 226 |
| Av | 114 | 415 | 301 | 332 | 381 | 226 |
| At end of— | | | | | | |
| 1st day | 245 | 438 | 393 | 436 | 448 | 401 |
| 2d day | 170 | 453 | 390 | 402 | 445 | 152 |
| 3d day | 100 | 431 | 362 | 376 | 416 | 345 |
| 4th day | 57 | 405 | 365 | 375 | 407 | 339 |
| Av | 143 | 432 | 378 | 397 | 429 | 309 |

Table IV presents additional in vitro examples in which urea has been used to replace increments of soybean meal in the nutrient mixture. The ammonia level data show that those examples in which urea has provided ⅓, ½ and ⅔ replacement of the soybean meal give 88%, 92% and 99% of the ammonia level produced where the urea was the sole source of nitrogen supplement. Thus it is apparent that mere dilution of the urea by other feed ingredients is not sufficient to suppress the ammonia level to the extent provided by the non-protein nitrogen supplements of the invention as described above.

In Table III cellulose digestion in vitro is given for the flask contents of urea compared with formamide, guanidine carbonate and ammonium lactate. Column 1 involves a "negative" nitrogen control and it will be noted that cellulose digestion averaged 25% over the four day period. The inclusion of nitrogen containing compounds improved cellulose digestion as indicated by columns 2, 3, 4 and 5, in which cellulose digestion ranged from 58% to 79%. These data clearly indicate that in addition to the safety provided by such materials as formamide, guanidine carbonate and ammonium lactate, there was ample nitrogen available to maintain good cellulose digestion. Similar data have established that the urea-aldehyde compositions of the invention augment cellulose digestion. Cellulose digestion is one of the primary functions of first stomachs of cattle and like animals.

In the formulation of feeds for cattle and sheep, the urea, or the urea derivatives, can be used to supply one quarter to two-fifths, and preferably about one-third of the protein requirements of the animal. This is a general rule that can be followed for complete rations for the production of protein concentrate mixtures, or for the preparation of pelleted products. In the preparation of such formulated feeds it is desirable that the non-protein nitrogen constituents be dry mixed with the other feed ingredients so that they be evenly distributed throughout the feed. Inasmuch as, however, the toxicity of the urea derivatives is remarkably less than that of the urea per se, the danger of inadequate mixing is greatly reduced. Any suitable mixtures may be employed as, for example, a 14% protein feed can be made into an 18% feed composition by the addition of slightly more than 30 pounds of urea-nitrogen in the derivative per ton of feed. The usual type of feed composition is employed to provide the normal amount of carbohydrate content which may be supplied by wheat, oats, barley, corn, hominy, molasses and the like. These feeds also contain certain oil meals and the like to supply natural proteins. For example, a typical 20% dairy ration for cattle may contain 300 lbs. of wheat bran, 310 lbs. of hominy feed, 200 lbs. of crimped oats, 300 lbs. of distillers' dried grains, 175 lbs. of soybean oil meal, 150 lbs. of molasses, 35 lbs. of urea-formaldehyde condensation product, 70 lbs. of brewers' dried grains and 50 lbs. of minerals and salt.

Cattle are usually supplied with a diet of grass, hay and the like. Augmented by a food concentrate such as that described in the last paragraph, these feed concentrates may contain from 10 to 50% protein, a small amount of minerals and the remainder mainly carbohydrate. The minerals may be added directly to the feed concentrate. When preparing the concentrate in this manner such minerals as, e. g., defluorinated phosphate rock, salt and the like may be used. Contrariwise, the minerals may be indirectly added with the carbohydrate and/or protein as a normal part of those ingredients. In preparing such feed concentrates it has been found that the nitrogen compounds hereinbefore described, and more particularly the urea-formaldehyde condensation products, may constitute from 5 to 90% of the nitrogen content of the feed, the remainder of the nitrogen being provided by protein.

The invention provides a source of protein for ruminants which permits the use of greater amounts of certain non-protein nitrogen than has heretofore been possible.

The invention is not limited to the specific compositions described, nor to their specific proportions for the rate of utilization and its efficiency, as will be appreciated by those skilled in the art, is determined in large measure by the availability of the nitrogen to the rumen microorganisms and as a consequence, the percentage ingestion of a given urea derivative that can be used varies over a wide range in accord with the specific derivative and the ammonia evolved during urea breakdown by the rumen.

I claim:

1. A ruminant feed composition containing carbohydrates and protein and as a supplementary source of nitrogen other than protein, a condensation product of urea and an aldehyde.

2. A ruminant feed composition containing carbohydrates and protein and as a supplementary source of nitrogen other than protein, a urea-formaldehyde condensation product.

3. A ruminant feed composition containing protein and as a supplementary source of nitrogen, a condensation product of urea and an aldehyde.

4. A ruminant feed composition containing protein and as a supplementary source of nitrogen, a condensation product of urea and formaldehyde.

5. A ruminant feed composition containing a carbohydrate and a condensation product of urea and an aldehyde.

6. A ruminant feed composition containing carbohydrates, minerals, protein and as a supplementary source of nitrogen, a condensation product of urea and formaldehyde containing from 35 to 44% nitrogen, from 20 to 65% insoluble urea-formaldehyde reaction products, from 30 to 75% soluble urea-formaldehyde reaction products and from 5 to 20% unreacted urea.

7. A ruminant feed composition containing carbohydrates, minerals and protein, and as a supplementary nitrogen source a condensation product of urea and an aldehyde supplying from 5 to 90% of the nitrogen content of the feed.

8. A ruminant feed composition containing carbohydrates, minerals and protein, and as a supplementary nitrogen source a condensation product of urea and formaldehyde supplying from 5 to 90% of the nitrogen content of the feed.

9. A ruminant feed concentrate containing from 10 to 50% protein, minerals and the remainder mainly carbohydrate products, a condensation product of urea and formaldehyde supplying from 5 to 90% of the nitrogen content of the feed.

10. A ruminant feed composition containing carbohydrates, minerals and about 5% nitrogen derived from a condensation product of urea and formaldehyde containing from 30 to 75% soluble urea-formaldehyde reaction products.

11. In a process for the preparation of a ruminant feed composition containing carbohydrates, minerals, protein and other nitrogen containing substances, the step which comprises incorporating in the composition a condensation product of urea and formaldehyde containing from 35 to 44% nitrogen, from 20 to 65% insoluble urea-formaldehyde reaction products, from 30 to 75% soluble urea-formaldehyde reaction products and from 5 to 20% unreacted urea to constitute the other nitrogen containing substances of the feed.

12. A ruminant feed composition containing minerals, carbohydrates, protein and a supplementary source of nitrogen comprising a condensation product of urea and an aldehyde.

References Cited in the file of this patent

UNITED STATES PATENTS

| Number | Name | Date |
|---|---|---|
| 2,508,599 | Elmsie | May 23, 1950 |
| 2,560,830 | Turner | July 17, 1951 |
| 2,592,565 | Harvey | Apr. 15, 1952 |

FOREIGN PATENTS

| Number | Country | Date |
|---|---|---|
| 541,594 | Great Britain | Dec. 3, 1941 |